United States Patent Office 3,776,966
Patented Dec. 4, 1973

---

3,776,966
CATALYTIC ISOMERIZATION PROCESS FOR THE PRODUCTION OF 5-ETHYLIDENEBICYCLO[2.2.1] HEPT-2-ENES
Wolfgang Schneider, Brecksville, Ohio, assignor to The B. F. Goodrich Company, Akron, Ohio
No Drawing. Filed Oct. 30, 1972, Ser. No. 302,093
Int. Cl. C07c 5/28
U.S. Cl. 260—666 PY                            10 Claims

ABSTRACT OF THE DISCLOSURE 5-vinylbicyclo[2.2.1]hept-2-ene is isomerized to 5-ethylidenebicyclo[2.2.1]hept-2-ene when contacted with a catalyst comprising a titanium compound such as titanium alcoholates and cyclopentadienyl titanium halides with a Group I–A, II–A, III–A of lanthanide metal in combination with a halide of iron, zinc, or zirconium. 5-ethylidenebicyclo[2.2.1]hept-2-ene is a useful comonomer for polymerization with α-olefins such as ethylene and propylene.

BACKGROUND OF THE INVENTION

While catalytic processes for the isomerization of 5-vinylbicyclo[2.2.1]hept - 2 - ene to 5 - ethylidenebicyclo-[2.2.1]hept-2-ene are known, many are not completely satisfactory. Large amounts of catalyst often are required to achieve acceptable isomerization rates. Polymeric residues and re-arrangement by-products also result.

SUMMARY OF THE INVENTION

An effective catalytic process for the isomerization of 5-vinylbicyclo[2.2.1]hept - 2 - ene to 5 - ethylidenebicyclo-[2.2.1]hept-2-ene is provided. The catalyst system for the present process is comprised of a titanium compound selected from the group consisting of titanium alcoholates and cyclopentadienyl titanium halides and a metal of Group I–A, II–A, III–A or lanthanide group with a halide of zinc, iron or zirconium. The isomerization may be represented as follows:

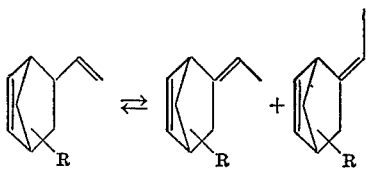

wherein R is a hydrogen or alkyl group containing from 1 to 4 carbon atoms. The present isomerization process is particularly useful to obtain 5-ethylidenebicyclo[2.2.1] hept-2-ene which is useful for copolymerization with olefins such as ethylene and propylene to form elastomeric materials. Polymeric and re-arrangement by-products are minimized with the process of the present invention.

DETAILED DESCRIPTION 5-vinylbicyclo[2.2.1]hept-2-ene's employed in the present process and capable of being isomerized to 5-ethylidenebicyclo[2.2.1]hept-2-ene have the structural formula

wherein R is a hydrogen or an alkyl group containing from 1 to 4 carbon atoms. The process is particularly useful for the isomerization of 5-vinylbicyclo[2.2.1]hept-2-ene, that is, where R is hydrogen, since this material is readily available by the Diels-Alder addition of 1,3-cyclopentadiene and 1,3-butadiene. Other 5-vinylbicyclo-[2.2.1]hept-2-ene's such as methyl-5-vinylbicyclo[2.2.1] hept-2-ene obtained by the reaction of 1,3-cyclopentadiene with piperylene or methyl-1,3-cyclopentadiene with butadiene are also effectively isomerized by the present process.

The catalyst employed in the present process is comprised of a titanium compound with a Group I–A, II–A, III–A or lanthanide group metal in combination with a halide of zinc, iron or zirconium. Titanium compounds employed are selected from the group consisting of titanium alcoholates having the formula $Ti(OR)_y(X)_{4-y}$ wherein X is chlorine, bromine or iodine and R is a hydrocarbon radical containing from 1 to 12 carbon atoms, and more preferably from 1 to 8 carbon atoms, such as alkyl, cycloalkyl, aryl, alkaryl and aralkyl groups and y is an integer from 1 to 4; and cyclopentadienyl titanium halide compounds having the formula

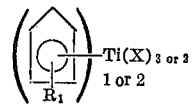

wherein X is chlorine, bromine, or iodine, $R_1$ is hydrogen or an alkyl group containing from 1 to 4 carbon atoms and wherein the titanium atom has no more than four available valencies satisfied. Accordingly, when a single cyclopentadienyl group is present three halogens will be bonded to the titanium and when two cyclopentadienyl groups are present two halogens will be bonded to the titanium. Cyclopentadienyl titanium halides have been described by G. Wilkinson et al. in J. Amer. Chem. Soc., 76, 4281 (1954). Illustrative of the titanium compounds are: cyclopentadienyl titanium trichloride, cyclopentadienyl titanium tribromide, dicyclopentadienyl titanium dichloride, dicyclopentadienyl titanium dibromide, tetraethyl titanate, tetra(isopropyl)titanate, tetra(n-butyl) titanate, tetra(2-ethylhexyl)titanate, tetraphenyl titanate, $(C_2H_5O)_3TiCl$, $(C_2H_5O)_2TiCl_2$, $C_2H_5OTiCl_3$ and the like.

Employed with the titanium compound is a Group I–A, II–A, III–A or lanthanide metal in combination with a metal halide of iron, zinc or zirconium. Typical metals used with the titanium compound include lithium, rubidium, potassium, barium, strontium, calcium, sodium, magnesium, beryllium, aluminum, cerium and the like. Alloys or mixtures of two or more of the above-mentioned metals may also be used. The meals are conveniently used in a form in which they have a large surface area, for example, as chips or powder or dispersed in an inert hydrocarbon solvent. The latter method is particularly useful since it facilitates handling and storing the metals. The alkali metals lithium, sodium and potassium are especially useful with the present process. Typical halides of the metals used with the Group I–A, II–A, III–A or lanthanide metal include iron chloride, zinc chloride and zirconium chloride.

The catalyst for the present isomerization process is obtained by contacting the titanium compound with the metal and metal halide combination. The catalyst may be prepared prior to use or the individual catalyst components may be mixed in the reactor in the presence of the 5-vinylbicyclo[2.2.1]hept-2-ene to be isomerized. If the catalyst is prepared prior to the isomerization the catalyst components are generally mixed in an inert hydrocarbon solvent. This latter procedure facilitates storing and charging of the catalyst and is also advantageous as a means to control any reaction exotherm which might result.

While the ratio of the titanium compound to the metal/ metal halide may be varied over a wide range it is generally required that about 1 to 10 mol equivalent of the metal/metal halide be employed per mol equivalent of the titanium compound. It is often advantageous to employ a molar excess of the metal/metal halide to remove any impurities such as oxygen, alcohol, water and the like from the system. Excellent results have been observed when about 2 to 5 mol equivalents of the metal/metal halide per mol equivalent of the titanium compound is employed. The molar ratio of metal to metal halide will be varied from about 10:1 to about 1:1.

While the concentration of the titanium compound is not critical it will generally range from about 100 millimols per mol 5-vinylbicyclo[2.2.1]hept-2-ene to about 0.1 millimol per mol 5-vinylbicyclo[2.2.1]hept-2-ene. Excellent results have been obtained when the concentration of the titanium compound ranges from about 1 to 50 millimols per mol 5-vinylbicyclo[2.2.1]hept-2-ene.

Isomerization is achieved by contacting the 5-vinylbicyclo[2.2.1]hept-2-ene with the catalyst at room temperature, or slightly below, or at elevated temperatures. The 5-vinylbicyclo[2.2.1]hept-2-ene is charged to the reactor and the preformed catalyst or the individual catalyst components added thereto. The preformed catalyst or each catalyst component may be charged completely at the outset of the isomerization or charged continuously or incrementally as the isomerization progresses. The isomerization process may be conducted employing either batch or continuous techniques. Prior to the introduction of the preformed catalyst or of the titanium compound, when the catalyst is to be prepared in situ, an amount of the metal/metal halide may be charged to the reactor to remove any undesirable impurities which may be present in the system.

The isomerization is conducted at a temperature ranging from about 15° C. to about 200° C. or above. Excellent results have been obtained over the temperature range 25° C. to about 150° C. When continuous processes such as those employing tubular reactors, temperatures greater than 200° C. may be employed. The process is typically carried out under a dry atmosphere of an inert gas such as nitrogen or argon. It may be conducted at atmospheric, sub-atmospheric or super-atmospheric pressure depending on the reaction conditions.

An inert diluent such as the aromatic or saturated aliphatic hydrocarbons may be used in conducting the present process. High-boiling hydrocarbons of this type are particularly useful since they do not interfere with the recovery of the 5-ethylidenebicyclo[2.2.1]hept-2-ene and since they also permit the operation of the process within the desired temperature range without the use of pressure vessels. Useful hydrocarbon solvents include pentane, isopentane, 2,2-dimethyl pentane, 2,4-dimethyl pentane, 3,3-dimethyl pentane, 3-ethyl pentane, n-hexane, isohexane, 3-methyl hexane, n-heptane, n-octane, isooctane, cyclohexane, benzene, toluene, xylene, mesitylene, and mixtures thereof. If a diluent is employed the ratio of the diluent to 5-vinylbicyclo[2.2.1]hept-2-ene will range between about 1:10 to about 10:1 on a volume basis.

The following examples illustrate the invention more fully.

EXAMPLE I 0.1 mol (12 grams) of 5-vinylbicyclo[2.2.1]hept-2-ene prepared by the Diels-Alder addition of 1,3-cyclopentadiene and 1,3-butadiene as described by A. F. Plate and N. A. Belikova in Zhurnal Obschchei Khimii, 30, No. 12, 3945–53 (1969) was charged to a reactor which had been previously purged with argon. 0.001 mol (0.25 gram) dicyclopentadienyl titanium dichloride, 0.004 mol (0.2 gram) of a 50% sodium metal suspension in mineral oil and 0.001 mol (0.16 gram) of FeCl₃ were then charged to the reactor. The reaction mixture was allowed to stand under an argon atmosphere at 30° C. with stirring for approximately 90 hours after which time vapor phase chromatographic analysis showed 89.5 5-ethylidenebicyclo[2.2.1]hept-2-ene to be present.

Employing similar reaction conditions, a mixture of 1- and 2-methyl-5-vinylbicyclo[2.2.1]hept-2-ene obtained by the Diels-Alder addition of methylcyclopentadiene and 1,3-butadiene is isomerized to the corresponding methyl-substituted 5 - ethylidenebicyclo[2.2.1]hept-2-ene. Tetrabutyl titanate or tetra-2-ethylhexyl titanate may be used in place of the dicyclopentadienyl compound.

EXAMPLE II

Example I was repeated with a difference that zinc chloride is used in place of iron chloride, 91.1% 5-ethylidenebicyclo[2.2.1]hept-2-ene was found to be present in the reaction mixture.

EXAMPLE III

Example I was repeated with 0.001 mol (0.23 gram) zirconium tetrachloride being used in place of iron chloride. 79.7% 5-ethylidenebicyclo[2.2.1]hept-2-ene was formed.

5-ethylidenebicyclo[2.2.1]hept-2-ene is polymerized in solution with ethylene and propylene. To 500 mls. hexane maintained at −10° C. and saturated with a gas mixture (30 mol percent ethylene/70 mol percent propylene) is added 0.813 gram 5-ethylidenebicyclo[2.2.1]hept-2-ene and a reduced vanadium catalyst system (Al/V mol ratio=167). Throughout the polymerization the gas mixture (30/70) is continuously fed into the polymerizer with continuous agitation so that a concentration of about 30 mol percent ethylene is in the gas phase above the liquid. The polymerization is allowed to run for approximately 15 minutes. Approximately 4½ grams terpolymer are obtained upon precipitation with alcohol. The polymer contains about 33% by weight propylene and about 10% by weight 5-ethylidenebicyclo[2.2.1]hept-2-ene. Compounded polymers of this type are useful in the manufacture of tire carcass. Compounded with about 80 parts black, 40 parts oil, 0.8 part TMTD, 0.4 part MBTS and 1.25 parts sulfur and cured at 320° F., tensiles of about 300 p.s.i. with about 250% elongation are typically realized.

I claim:

1. A process for the isomerization of 5-vinylbicyclo[2.2.1]hept-2-ones to 5-ethylidenebicyclo[2.2.1]hept-2-enes which comprises contacting a 5-vinylbicyclo[2.2.1]hept-2-ene of the formula

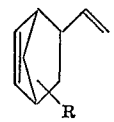

wherein R is a hydrogen or an alkyl group containing from 1 to 4 carbon atoms with a catalyst consisting of (1) a titanium compound selected from the group consisting of titanium alcoholates of the formula

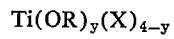

wherein X is chlorine, bromine or iodine, R is hydrocarbon radical containing from 1 to 8 carbon atoms and $y$ is an integer from 1 to 4 of a cyclopentadienyl titanium halide of the formula

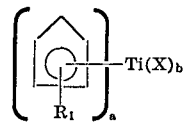

wherein X is chlorine, bromine or iodine, $R_1$ is hydrogen or an alkyl group containing from 1 to 4 carbon atoms, $a$ is 1 or 2, $b$ is 2 or 3 and $a+b=4$; and (2) a Group I-A, II-A, III-A or lanthanide metal with a metal halide of zinc, iron or zirconium.

2. The process of claim 1 wherein the 5-vinylbicyclo[2.2.1]hept-2-ene is 5-vinylbicyclo[2.2.1]hept-2-ene, the isomerization is conducted at a temperature between about 15° C. to 200° C. with a concentration of (1)

from about 100 to 0.1 millimol per mol 5-vinylbicyclo-[2.2.1]hept-ene and a molar ratio of (2):(1) from about 1:1 to about 10:1 and the molar ratio of metal:metal halide is from about 10:1 to about 1:1.

3. The process of claim 2 wherein isomerization is conducted in an inert aromatic or saturated aliphatic hydrocarbon diluent.

4. The process of claim 2 wherein (2) is an alkali metal or an alkali metal with metal halide and the molar ratio of (2):(1) is from 2:1 to 5:1 and the concentration of (1) is between 1 to 50 millimols per mol 5-vinyl-bicyclo[2.2.1]hept-2-ene.

5. The process of claim 4 wherein (1) is dicyclopentadienyl titanium dichloride and (2) is sodium metal.

6. The process of claim 4 wherein (1) is tetrabutyl titanate (2) is sodium metal.

7. The process of claim 4 wherein (1) is tetra-2-ethylhexyl titanate and (2) is sodium metal.

8. The process of claim 5 wherein the metal halide is iron chloride.

9. The process of claim 5 wherein the metal halide is zinc chloride.

10. The process of claim 5 wherein the metal halide is zirconium chloride.

References Cited

UNITED STATES PATENTS

| | | | |
|---|---|---|---|
| 3,151,173 | 9/1964 | Nyce | 260—666 Py |
| 3,347,944 | 10/1967 | Fritz et al. | 260—666 Py |
| 3,535,396 | 10/1970 | Schneider | 260—666 Py |
| 3,538,171 | 11/1970 | Schneider | 260—666 Py |
| 3,535,395 | 10/1970 | Schneider | 260—666 Py |
| 3,591,647 | 7/1971 | Schneider | 260—666 Py |
| 3,629,348 | 12/1971 | Courduvelis | 260—666 Py |
| 3,683,038 | 8/1972 | Schneider | 260—666 Py |
| 3,683,039 | 8/1972 | Schneider | 260—666 Py |
| 3,694,517 | 9/1972 | Schneider | 260—666 Py |

DELBERT E. GANTZ, Primary Examiner

V. O'KEEFE, Assistant Examiner

UNITED STATES PATENT OFFICE
CERTIFICATE OF CORRECTION

Patent No. 3,776,966            Dated December 4, 1973

Inventor(s) Wolfgang Schneider

It is certified that error appears in the above-identified patent and that said Letters Patent are hereby corrected as shown below:

Column 1, line 17, "of" should read --or--.

Column 3, line 66, "(1969)" should read --(1960)--.

Column 4, line 59, Claim 1, "of" should read --or--.

Signed and sealed this 23rd day of July 1974.

(SEAL)
Attest:

McCOY M. GIBSON, JR.            C. MARSHALL DANN
Attesting Officer               Commissioner of Patents